Jan. 20. 1925.  1,523,690

E. M. HORTON

HOLDING DEVICE FOR ANIMAL TRAPS

Filed March 23, 1922

WITNESSES
W. A. Williams
L. G. Bates

INVENTOR
E. M. Horton
BY
Munn & Co.
ATTORNEYS

Patented Jan. 20, 1925.

1,523,690

UNITED STATES PATENT OFFICE.

EDWARD MANDLY HORTON, OF KETCHIKAN, TERRITORY OF ALASKA, ASSIGNOR OF ONE-HALF TO ARTHUR MOA, OF KETCHIKAN, TERRITORY OF ALASKA.

HOLDING DEVICE FOR ANIMAL TRAPS.

Application filed March 23, 1922. Serial No. 545,965.

*To all whom it may concern:*

Be it known that I, EDWARD MANDLY HORTON, a citizen of the United States, and a resident of Ketchikan, Territory of Alaska, have invented certain new and useful Improvements in Holding Devices for Animal Traps, of which the following is a specification.

My invention relates generally to devices for holding animal traps against being dragged any considerable distance by an animal caught therein, more particularly to holding devices adapted to prevent the return to land of an animal which has been caught in a trap set adjacent to the edge of a body of water and has plunged into the water after being caught, and it consists in the combinations, constructions and arrangements herein described and claimed.

A further object of my invention is to provide a device of the character described which has a novel means for permitting movement in one direction for a certain distance, of an animal caught in a trap attached to the device and for preventing any return or retrograde movement of the animal.

A still further object of my invention is to provide a device of the character described which is easy of application, not likely to get out of order easily, and thoroughly practical commercially.

Other objects and advantages will be apparent from the following description, and the novel features of the invention will be particularly outlined in the appended claims.

My invention is illustrated in the accompanying drawings, forming a part of this application, in which.

In carrying out my invention, I make use of an anchoring member 1 which may be a wire, a rod or a flexible element, such as a length of chain or a non-metallic cable. The anchoring member 1 is adapted to be secured at one end to a stake 2 or like fixed support. An anchor 3 which may be a bag of sand or the like, or a relatively heavy element, such as a piece of metal or a stone, is attached to the anchoring member at its other end.

Figure 1:
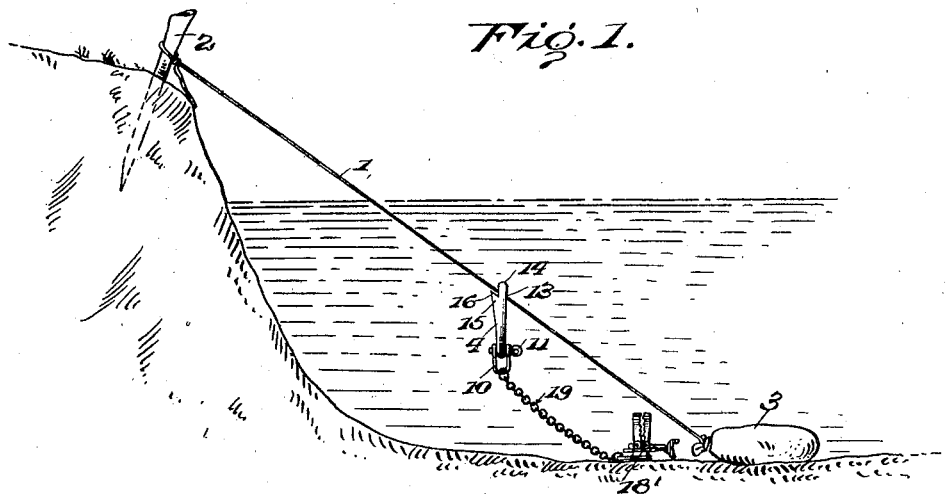
Fig. 1 is a view showing the device operatively applied.
Figure 2:
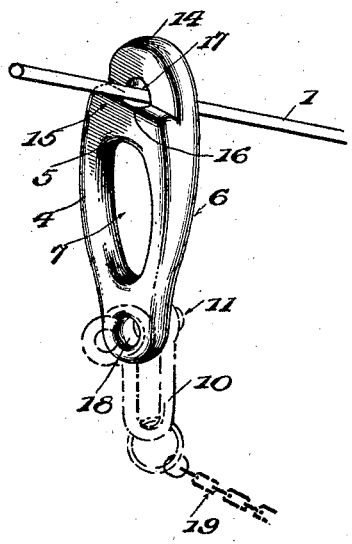
Fig. 2 is a perspective view showing a holding plate embodying the invention upon a guiding and anchoring member.
Figure 3:
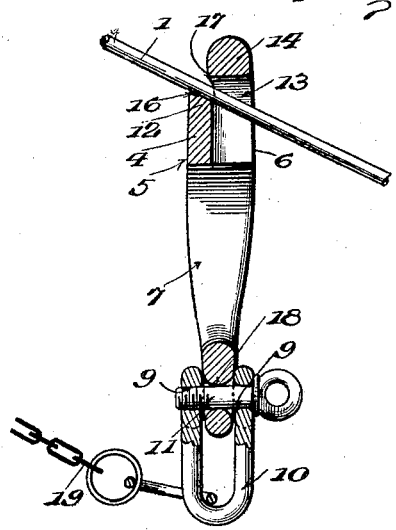
Fig. 3 is a vertical section through the holding member.

A holding member adapted to coact with the anchoring member 1 in a manner which will be hereinafter described in detail, consists of an elongated body 4 which is shown as having substantially flat opposite faces 5 and 6 respectively and as having a relatively large opening or aperture 7 formed therethrough for the sake of lightness and economy in the use of the material of which the body 4 is composed. The body 4 is provided with an eye 18 opening through the faces 5 and 6 at one end thereof and being adapted to register with eyes 9—9 formed through the spaced-apart arms of a clevis 10, whereby the clevis 10 may be pivotally attached to the body 4 by means of a shoulder 15 or bolt 11 which is projected through one of the eyes of the clevis 10, through the eye 18, and threadedly engages the other eye of the clevis, as clearly shown in Fig. 3.

A bore 12 extends obliquely through the body 4 adjacent to the end thereof remote from that provided with the eye 18. The bore 12 is counter-bored or enlarged at the end thereof opening through the side 5 of the body, as indicated at 13 and the counter-bore or enlarging recess 13 may be of such extent as to communicate with the aperture 7. The bore 12 at its other end opens through an inwardly offset portion 14 of the wall 6 and through a shoulder 15 defined by offsetting the portion 14 at the juncture of the shoulder 15 with the offset portion 14. With this construction, a gripping edge 16 is provided at the lower side of the end of the bore opening through the shoulder 15 and a cooperating gripping edge 17 is provided at the upper side of the bore at the place where the bore opens through the offset wall 14.

From the foregoing description of the various parts of the device, the operation thereof may be readily understood. The bore 12 is adapted to have the anchoring member 1 projected therethrough before the end of the anchoring member is attached to the fixed support 2. In actual practice, the fixed support 2 will be located upon the bank of a stream or other body of water and of course above the water line of the body of water. A trap 18' which may be of any suitable known type of construction is attached by means of a chain 19 to the clevis or shackle 10 and thus connected to the body 4 of the holding member. It is to be observed at this point that the holding member is placed upon the anchoring member 1 so that the sides of the body 4 provided with the offset or cut away end portion 14 is proximate to or faces the fixed support to which the anchoring member 1 is secured. The body 4 will therefore slide freely along the anchoring member 1 in the direction away from the fixed support 2. It is well known that certain animals, such as beavers and muskrats, will, when caught, plunge into a body of water if the trap in which caught can be dragged into the latter in an endeavor to escape from the trap. When such efforts have been found fruitless, the animal will endeavor to return to land in order that it may free itself from the trap by gnawing off the caught member. When my device is operatively applied, the movable end of the anchoring member 1 is preferably anchored upon the bed of a body of water and since the holding member 4 is adapted to slide along the anchoring member 1 from the fixed support 2 toward the anchor 3 an animal caught in the trap 18' is permitted to plunge into the body of water in which one end of the anchoring member 1 is anchored. When the animal attempts to return to land, the body 4 of the holding member will be swung with a toggle-like action relatively to the anchoring member 1 and will bind the latter along the edges 16 and 17, thus preventing any retrograde movement of the body 4. The animal is thus held against leaving the water and generally from proceeding to or remaining at the surface of the body of water, whereby the drowning of the caught animal is assured.

I claim:—

In a device of the character described, an elongated substantially straight body having an attaching portion at one end thereof and having substantially flat opposite faces, one of said opposite faces being offset inwardly adjacent to the second end of the body, thus producing a transverse shoulder lying in a plane extending substantially at right angles to the longitudinal axis of the body, said body having a bore extending transversely through the offset portion of said one face at the juncture of the latter with said shoulder and being enlarged toward the first named end of the body.

EDWARD MANDLY HORTON.